US008014405B2

United States Patent
Medford

(10) Patent No.: US 8,014,405 B2
(45) Date of Patent: Sep. 6, 2011

(54) UPGRADING ATM EMBEDDED NETWORKS TO CARRY IP SIGNALS

(75) Inventor: Brad A. Medford, Austin, TX (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 1089 days.

(21) Appl. No.: 10/797,913

(22) Filed: Mar. 10, 2004

(65) Prior Publication Data

US 2005/0201384 A1   Sep. 15, 2005

(51) Int. Cl.
   *H04L 12/28*   (2006.01)
(52) U.S. Cl. .................................. 370/395.52
(58) Field of Classification Search ............ 370/395.53, 370/395.52, 215, 395.51, 395.6, 395.1, 466, 370/389, 395.5, 203, 204, 205; 725/118; 375/279, 280, 315, 329, 316, 295, 283
   See application file for complete search history.

(56) References Cited

U.S. PATENT DOCUMENTS

| | | | |
|---|---|---|---|
| 3,701,106 A * | 10/1972 | Loshbough | 377/39 |
| 5,432,627 A * | 7/1995 | Nishio | 398/54 |
| 5,459,600 A * | 10/1995 | Davis et al. | 398/43 |
| 5,610,907 A | 3/1997 | Barrett | |
| 5,761,351 A | 6/1998 | Johnson | |
| 5,773,817 A | 6/1998 | Kingsley et al. | |
| 5,815,531 A * | 9/1998 | Dent | 375/298 |
| 6,160,802 A | 12/2000 | Barrett | |
| 6,330,239 B1 * | 12/2001 | Suzuki | 370/395.1 |
| 6,415,002 B1 * | 7/2002 | Edwards et al. | 375/261 |
| 6,479,978 B1 * | 11/2002 | Aliahmad et al. | 324/76.77 |
| 6,492,904 B2 | 12/2002 | Richards | |
| 6,505,032 B1 | 1/2003 | McCorkle et al. | |
| 6,522,667 B1 * | 2/2003 | Oda et al. | 370/474 |
| 6,535,331 B2 | 3/2003 | Shiota et al. | |
| 6,549,587 B1 | 4/2003 | Li | |
| 6,608,874 B1 * | 8/2003 | Beidas et al. | 375/353 |
| 6,643,417 B2 | 11/2003 | Strutz et al. | |
| 6,721,797 B1 | 4/2004 | Kim | |
| 6,735,238 B1 | 5/2004 | McCorkle | |
| 6,757,251 B1 | 6/2004 | Nakaishi | |
| 6,831,981 B2 * | 12/2004 | Edasawa et al. | 380/278 |
| 6,870,836 B1 * | 3/2005 | Dyke et al. | 370/355 |
| 6,940,859 B2 * | 9/2005 | Czerwiec et al. | 370/395.1 |
| 6,996,134 B1 * | 2/2006 | Renucci et al. | 370/535 |
| 7,376,144 B2 * | 5/2008 | Levi et al. | 370/458 |
| 2002/0021659 A1 * | 2/2002 | Meijen et al. | 370/217 |
| 2003/0138061 A1 | 7/2003 | Li | |
| 2003/0210912 A1 * | 11/2003 | Leuthold et al. | 398/188 |
| 2004/0081402 A1 | 4/2004 | Ouchi | |
| 2004/0143428 A1 | 7/2004 | Rappaport et al. | |
| 2004/0264400 A1 * | 12/2004 | Lee et al. | 370/319 |
| 2005/0138670 A1 * | 6/2005 | Ploumen | 725/118 |

* cited by examiner

*Primary Examiner* — Kwang B Yao
*Assistant Examiner* — Anh Ngoc Nguyen
(74) *Attorney, Agent, or Firm* — Toler Law Group

(57) ABSTRACT

An Asynchronous Transfer Mode (ATM) signal is phase modulated based on an Internet Protocol (IP) signal to form a combined ATM/IP signal. The ATM signal is phase modulated without exceeding a specified tolerance of symbol period of the ATM signal. The combined ATM/IP signal is communicated on a passive optical network to multiple receiving locations. An ATM stream specific to a receiving location can be extracted from the combined ATM/IP signal by an existing ATM-based optical network termination (ONT). An IP stream can be extracted at a receiving location by phase demodulating the combined ATM/IP signal.

11 Claims, 3 Drawing Sheets

UPGRADING ATM EMBEDDED NETWORKS TO CARRY IP SIGNALS

FIELD OF THE DISCLOSURE

The present disclosure relates to methods and systems for upgrading a network to an Internet protocol (IP) network.

BACKGROUND

A standard used in asynchronous transfer mode (ATM)-based networks is G.983. The G.983 standard supports three wavelengths: a 1490 nm downstream basic band, a 1550 nm downstream enhancement band, and a single 1310 nm upstream signal. FIG. 1 shows a standard G.983 optical transmission. The transmission is partitioned into symbol periods (as shown on the time axis) generated by a transmission system clock based on a data rate for communication. Each of the symbol periods represents either a binary "0" (a dim optical intensity) or a binary "1" (a bright optical intensity).

Upgrading standard G.983.1-based networks to IP-based Passive Optical Network (PON) networks typically requires a complete replacement of the optical network terminations (ONTs) and the optical line terminal (OLT). Upgrades to the OLT can be feasibly planned. However, replacing all of the ONTs may require taking an entire multipoint network out of service.

Accordingly, there is a need for an improved method and system of upgrading ATM networks to carry IP traffic.

BRIEF DESCRIPTION OF THE DRAWINGS

The present invention is pointed out with particularity in the appended claims. However, other features are described in the following detailed description in conjunction with the accompanying drawings in which:

DETAILED DESCRIPTION OF THE DRAWINGS

Embodiments of the present invention address how an ATM-based network can be upgraded to support IP-based network communications. The ATM-based network may facilitate communication in accordance with either the G.983.1 standard or an alternative standard. Beneficially, embodiments of the present invention enable embedded G.983.1 broadband PON (BPON) networks to be upgraded with one or more IP-based ONTs with no special enhancements or previous design considerations. Since upgraded IP-based ONTs can coexist with non-upgraded ATM-based ONTs on the same network, the upgrades to the ONTs can be performed on an as-needed basis.

Figure 2:
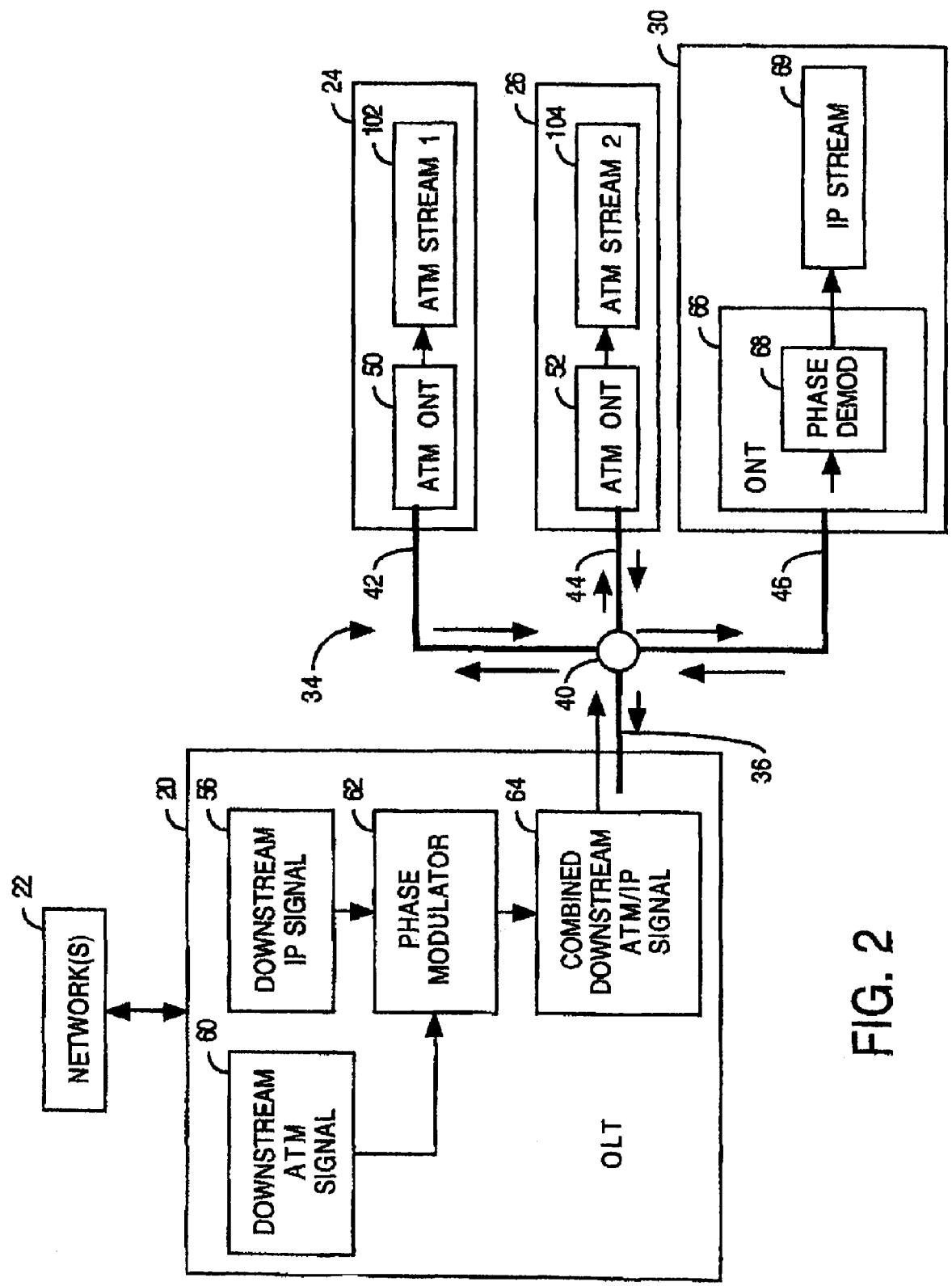
FIG. 2 is a block diagram of an embodiment of an ATM-based network which is upgraded to support IP.
Figure 3:
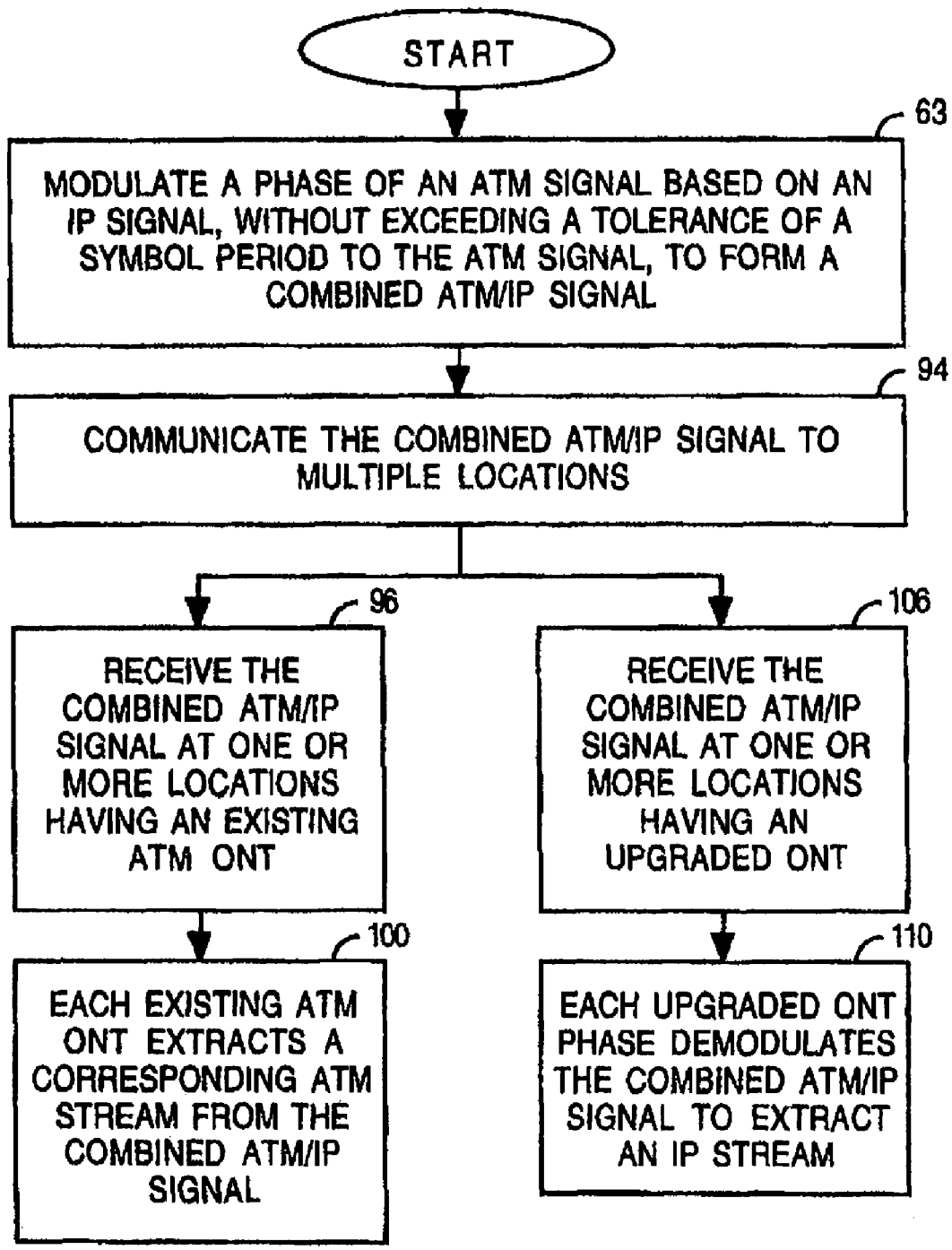
FIG. 3 is a flow chart of an embodiment of a method of communicating ATM and IP signals in an optical medium.

Embodiments of the present invention are described with reference to FIG. 2, which is a block diagram of an embodiment of an ATM-based network which is upgraded to support IP, and FIG. 3, which is a flow chart of an embodiment of a method of communicating ATM and IP signals in an optical medium. The network in FIG. 2 comprises an OLT 20 at a central office. The OLT 20 provides access to one or more networks 22 by multiple user locations. For purposes of illustration and example, three user locations 24, 26 and 30 are depicted in FIG. 2 although in practice any number of user locations can served by the network.

The user locations are coupled to the OLT 20 by a PON 34. The PON 34 comprises a single optical link 36 between the OLT 20 and a passive optical splitter/combiner 40. The splitter/combiner 40 splits downstream optical signals transmitted from the OLT 20 via the optical link 36. The downstream optical signals are split to multiple optical links 42, 44 and 46 for communication to the multiple user locations 24, 26 and 30, respectively. The splitter/combiner 40 also acts to combine upstream optical signals transmitted from the multiple user locations 24, 26 and 30 via the multiple optical links 42, 44 and 46, respectively. The combined upstream signals are communicated via the optical link 36 to the OLT 20.

Before being upgraded, each of the user locations has an ATM ONT coupled to its associated optical link of the PON 34. For example, the user location 24 has an ATM ONT 50 and the user location 26 has an ATM ONT 52. Each ATM ONT is used to receive a downstream ATM signal received via its optical link, and to extract an ATM stream specific to its user location based on the ATM signal. Further, each ATM ONT is used to transmit an upstream ATM signal to its optical link.

A time division multiple access method (TDMA) enables the multiple user locations to communicate with the central office via the optical link 36. In particular, each ATM ONT transmits within its own assigned time slot to enable multiple upstream signals to be multiplexed onto the optical link 36.

The OLT 20 communicates with the various ONTs 50 and 52 using an ATM protocol to form an overall ATM-based network. In one embodiment, the protocol is based on the G.983.1 standard although other standard and non-standard protocols are within the scope of this disclosure.

To upgrade the network to enable a downstream IP signal 56 to be communicated in addition to a downstream ATM signal 60, the central office is upgraded to include a phase modulator 62. As indicated by block 63 in FIG. 3, the phase modulator 62 performs an act of modulating a phase of the ATM signal 60 based on the IP signal 56 to form a combined ATM/IP signal 64. In one embodiment, the phase of the ATM signal 60 is modulated without exceeding a specified tolerance of a symbol period of the ATM signal. As a result, the combined ATM/IP signal 64 can be processed by the existing, non-upgraded ATM ONTs 50 and 52 in the network as if the downstream ATM signal 60 were transmitted instead. Further, an IP stream can be extracted from the ATM/IP signal 64 by an upgraded ONT 66. The upgraded ONT 66 comprises a phase demodulator 68 to phase demodulate the combined ATM/IP signal 64 to extract an IP stream 69.

Figure 1:
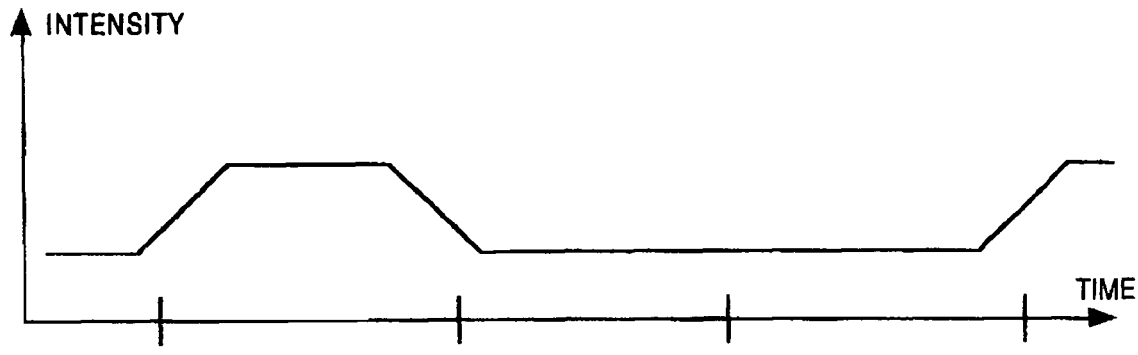
FIG. 1 (prior art) shows a standard G.983 optical transmission.
Figure 4:
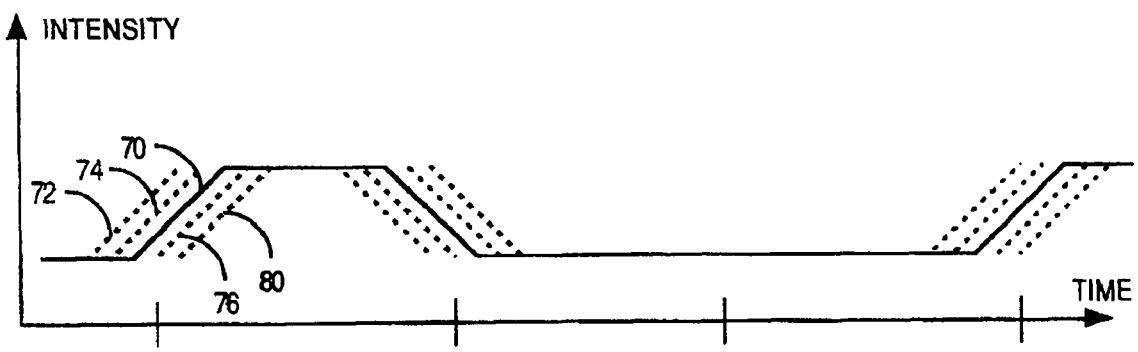
FIG. 4 illustrates an example of how a combined ATM/IP signal contrasts with the original ATM signal shown in FIG. 1.

FIG. 4 illustrates an example of how a combined ATM/IP signal contrasts with the original ATM signal shown in FIG. 1. Each pulse in a symbol period of the ATM signal, such as a pulse 70, is time shifted based on the IP signal. The time shift, which may be either forward or backward in time, has a length that is limited so as not to exceed the specified tolerance of the symbol period.

In the example of FIG. 4, the phase modulator 62 encodes two bits of the IP signal within each pulse of the ATM signal. As a result, four different time shifts 72, 74, 76 and 80 can occur for each pulse 70 of the ATM signal. The time-shifted pulse 72 encodes a 0-0 from the IP signal. The time-shifted pulse 74 encodes a 1-1 from the IP signal. The time-shifted pulse 76 encodes a 1-0 from the IP signal. The time-shifted pulse 80 encodes a 0-1 from the IP signal. In alternative embodiments, the phase modulator 62 can encode other numbers of bits of the IP signal within each pulse of the ATM signal based on the quality of the PON 34 or an alternative transport network.

Figure 5:
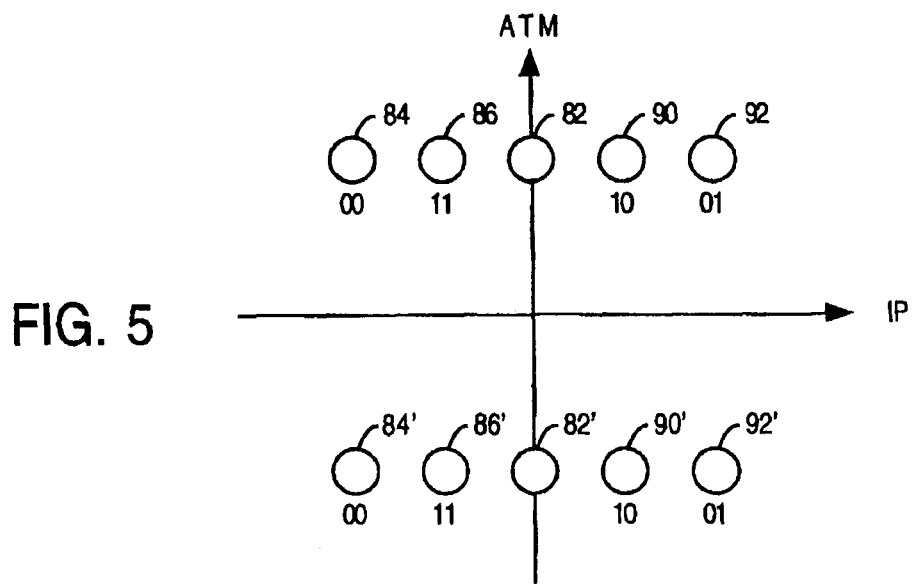
FIG. 5 is a constellation diagram of the combined ATM/IP signal of FIG. 4.

FIG. 5 is a constellation diagram of the combined ATM/IP signal of FIG. 4. States 82 and 82' represent the original ATM signal with no phase shift. States 84 and 84' represent the original ATM signal with a first phase shift to represent 0-0 from the IP signal. States 86 and 86' represent the original ATM signal with a second phase shift to represent 1-1 from the IP signal. States 90 and 90' represent the original ATM signal with a third phase shift to represent 1-0 from the IP signal. States 92 and 92' represent the original ATM signal with a fourth phase shift to represent 0-1 from the IP signal.

Referring back to FIG. 3, the method comprises an act of communicating the combined ATM/IP signal 64 to multiple locations in the network, as indicated by block 94. The combined ATM/IP signal 64 is communicated by the PON 34 from the OLT 20 to the user locations 24, 26 and 30.

As indicated by block 96, the method comprises an act of receiving the combined ATM/IP signal at one or more locations having a non-upgraded ONT. In the example of FIG. 2, the combined ATM/IP signal 64 is received by the non-upgraded ONTs 50 and 52. As indicated by block 100, the method comprises each non-upgraded ONT extracting a corresponding ATM stream from the combined ATM/IP signal 64. In the example of FIG. 2, the ATM ONT 50 extracts an ATM stream 102 specific to the user location 24, and the ATM ONT 52 extracts an ATM stream 104 specific to the user location 26, based on the combined ATM/IP signal 64.

As indicated by block 106, the method comprises an act of receiving the combined ATM/IP signal at one or more locations having an upgraded ONT. In the example of FIG. 2, the combined ATM/IP signal 64 is received by the upgraded ONT 66. As indicated by block 110, the method comprises each upgraded ONT phase demodulating the combined ATM/IP signal 64 to extract a specific IP stream. In the example of FIG. 2, the phase demodulator 68 of the ONT 66 phase demodulates the combined ATM/IP signal 64 to extract the IP stream 69. The phase demodulator 68 can decode multiple bits of the IP stream 69 per pulse in the combined ATM/IP signal 64. In the embodiment illustrated in FIGS. 4 and 5, the phase demodulator 68 is to decode two bits of the IP stream 69 per pulse in the combined ATM/IP signal 64.

It is noted that the method of forming a combined ATM/IP signal can also be used at ONTs at the user locations to generate an upstream signal. The upstream signal is communicated via the PON 34 to the OLT 20. The OLT 20 includes a phase demodulator to phase demodulate the upstream signal to extract an IP stream from a combined ATM/IP signal. Thus, embodiments of the ATM/IP signal can be communicated in the 1490 nm downstream basic band and the 1310 nm upstream band in a G.983-based network or another type of network.

The number of different symbols, M, that can be effectively phase modulated within a pulse of the ATM signal depends on the quality of the transport network. For example, an introduction of noise can cause symbol errors when extracting the IP signal from a noisy version of the combined ATM/IP signal 64. With respect to noise immunity of extracting the IP signal, it is expected that the probability of a symbol error, $P_E(M)$, as a function of M can be expressed as follows:

$$P_E(M) \cong 2Q\left(\sqrt{\frac{2E_S}{N_o}}\sin\frac{\pi}{M}\right)$$

where Q( ) is the complementary error function associated with the Gaussian distribution, $E_s = E_b(\log_2 M)$ is the energy per symbol, $E_b$ is the energy per bit, and $N_0$ is the level of single-sided power spectral density of white noise. The primary signals symbol error probability will increase to a degree that can be determined based on the number of phase states M in the particular implementation.

Since an IP symbol is represented within a bright-to-dim transition of an ATM pulse, the number of IP symbols represented within a time interval of the combined ATM/IP signal is based the number of bright-to-dim transitions within the time interval. Thus, high levels of low frequency content in the ATM signal will reduce the rate of representing IP symbols. The G.983 standard includes precautions, such as bit scrambling to increase a clock recovery and to reduce the probability of pathological situations. Scrambling with normal ONT Management and Control Interface (OMCI) traffic and the inherent operation of the network acts to reduce the level of low frequency content. Using multiple levels of IP symbols enables data rates higher than the standardized 155 Mb/s and 622 Mb/s data rates. Traditional clock recovery techniques, which are independent of the primary ATM data signal, may be used for extracting the IP signal.

It will be apparent to those skilled in the art that the disclosed embodiments may be modified in numerous ways and may assume many embodiments other than the particular forms specifically set out and described herein. For example, upgrading the OLT 20 can comprise interposing the phase modulator 62 between an existing ATM OLT and the PON 34, where an optical phase modulator is used as the phase modulator 62. This is in contrast to the embodiment of FIG. 2 where the phase modulator 62 is part of the upgraded OLT 20.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
receiving, at a first input of a phase modulator, a plurality of pulses associated with an asynchronous transfer mode signal, wherein each pulse includes data associated with the asynchronous transfer mode signal, and wherein each pulse is in a symbol period;
receiving, at a second input of the phase modulator, an internet protocol signal;
phase modulating a first pulse of the plurality of pulses by a first shift amount based on a first plurality of bits associated with the internet protocol signal to produce a first combined asynchronous transfer mode/internet protocol signal, the first combined asynchronous transfer mode/internet protocol signal including the first pulse and the first plurality of bits associated with the internet protocol signal, wherein the first shift amount does not exceed a tolerance of the symbol period associated with the first pulse; and communicating the first combined asynchronous transfer mode/internet protocol signal via an optical medium.

2. The method of claim 1, further comprising:

phase modulating a second pulse of the plurality of pulses by a second shift amount based on a second plurality of bits associated with the internet protocol signal to produce a second combined asynchronous transfer mode/internet protocol signal, the second combined asynchronous transfer mode/internet protocol signal including the second pulse and the second plurality of bits associated with the internet protocol signal, wherein the second plurality of bits is different from the first plurality of bits, wherein the second shift amount does not exceed a tolerance of the symbol period associated with the second pulse, and wherein the first shift amount is different from the second shift amount; and communicating the second combined asynchronous transfer mode/internet protocol signal via the optical medium.

3. The method of claim 1, wherein the first combined asynchronous transfer mode/internet protocol signal is transmitted via an asynchronous transfer mode-based network comprising a G.983-based network.

4. The method of claim 1, wherein communicating the first combined asynchronous transfer mode/internet protocol signal comprises:

transmitting the first combined asynchronous transfer mode/internet protocol signal via the optical medium to a first optical network termination, wherein the first optical network termination does not include demodulator circuitry; and transmitting the first combined asynchronous transfer mode/internet protocol signal to a second optical network termination, wherein the second optical network termination includes demodulator circuitry, wherein the first optical network termination is at a first user location and the second optical network termination is at a second user location, and wherein the first optical network termination is to extract the data associated with the asynchronous transfer mode signal that is uniquely associated with the first user location.

5. The method of claim 1, wherein the first combined asynchronous transfer mode/internet protocol signal is communicated via a passive optical network.

6. An apparatus to communicate an asynchronous transfer mode signal and an internet protocol signal, the apparatus comprising:

an optical line terminal comprising a phase modulator, the phase modulator configured to:

receive, at a first input of the phase modulator, a plurality of pulses associated with an asynchronous transfer mode signal, wherein each pulse includes data associated with the asynchronous transfer mode signal, and wherein each pulse is in a symbol period;

receive, at a second input of the phase modulator, an internet protocol signal; and phase modulate a first pulse of the plurality of pulses by a first shift amount based on a first plurality of bits associated with the internet protocol signal to produce a first combined asynchronous transfer mode/internet protocol signal, wherein the first combined asynchronous transfer mode/internet protocol signal includes the first pulse and the first plurality of bits associated with the internet protocol signal, and wherein the first shift amount does not exceed a tolerance of the symbol period associated with the first pulse, wherein the optical line terminal communicates the first combined asynchronous transfer mode/internet protocol signal via an optical medium.

7. The method of claim 1, further comprising demodulating the first combined asynchronous transfer mode/internet protocol signal and outputting an internet protocol stream derived from the first combined asynchronous transfer mode/internet protocol signal.

8. The apparatus of claim 6, wherein the first combined asynchronous transfer mode/internet protocol signal is transmitted via an asynchronous transfer mode-based network comprising a G.983-based network.

9. The apparatus of claim 6, wherein communicating the first combined asynchronous transfer mode/internet protocol signal comprises:

transmitting the first combined asynchronous transfer mode/internet protocol signal via the optical medium to a first optical network termination, wherein the first optical network termination does not include demodulator circuitry; and transmitting the first combined asynchronous transfer mode/internet protocol signal to a second optical network termination, wherein the second optical network termination includes demodulator circuitry, wherein the first optical network termination is at a first user location and the second optical network termination is at a second user location, and wherein the first optical network termination is to extract the data associated with the asynchronous transfer mode signal that is uniquely associated with the first user location.

10. The apparatus of claim 6, wherein the first combined asynchronous transfer mode/internet protocol signal is communicated via a passive optical network.

11. The apparatus of claim 6, wherein the phase modulator is further configured to phase modulate a second pulse of the plurality of pulses by a second shift amount based on a second plurality of bits associated with the internet protocol signal to produce a second combined asynchronous transfer mode/internet protocol signal, the second combined asynchronous transfer mode/internet protocol signal including the second pulse and the second plurality of bits associated with the internet protocol signal, wherein the second plurality of bits is different from the first plurality of bits associated with the internet protocol signal, wherein the second shift amount does not exceed a tolerance of the symbol period associated with the second pulse, and wherein the first shift amount is different from the second shift amount, and wherein the optical line terminal communicates the second combined asynchronous transfer mode/internet protocol signal via the optical medium.

* * * * *